United States Patent
Gunsaulis et al.

(10) Patent No.: US 6,896,077 B1
(45) Date of Patent: May 24, 2005

(54) ROTARY DRIVEN PIPE-BURSTING TOOL

(75) Inventors: Floyd R. Gunsaulis, Perry, OK (US);
David R. Payne, Perry, OK (US);
Michael L. Anderson, Pleasanton, CA (US)

(73) Assignee: The Charles Machines Works, Inc., Perry, OK (US)

( * ) Notice: Subject to any disclaimer, the term of this patent is extended or adjusted under 35 U.S.C. 154(b) by 0 days.

(21) Appl. No.: 10/287,270

(22) Filed: Nov. 4, 2002

(51) Int. Cl.$^7$ .............................. E21B 7/04; E21B 4/20; F16L 1/028

(52) U.S. Cl. ................ 175/62; 175/61; 175/263; 175/106; 405/184.3; 405/154.1

(58) Field of Search .................. 175/61, 62, 106, 175/263; 405/184.3, 184.1, 184, 156, 154.1

(56) References Cited

U.S. PATENT DOCUMENTS

| | | | |
|---|---|---|---|
| 2,037,955 A | 4/1936 | Wells | 81/188 |
| 3,181,302 A | 5/1965 | Lindsay | 61/72.7 |
| 4,505,302 A | 3/1985 | Streatfield et al. | 138/97 |
| 4,507,019 A | 3/1985 | Thompson | 405/154 |
| 4,674,914 A | 6/1987 | Wayman et al. | 405/154 |
| 4,693,404 A | 9/1987 | Wayman et al. | 225/103 |
| 4,507,019 A | 12/1987 | Thompson | 405/154 |
| 4,720,211 A | 1/1988 | Streatfield et al. | 405/154 |
| 4,723,873 A | 2/1988 | Masznyik | 405/156 |
| 4,738,565 A | 4/1988 | Streatfield et al. | 405/154 |
| 4,789,268 A | * 12/1988 | Yarnell | 405/184.2 |
| 4,903,406 A | 2/1990 | Schosek et al. | 30/92.5 |
| 4,925,344 A | 5/1990 | Peres et al. | 405/184 |
| 4,928,866 A | 5/1990 | Carruthers | 225/106 |
| 4,930,542 A | 6/1990 | Winkle et al. | 138/98 |
| 4,983,071 A | 1/1991 | Fisk et al. | 405/154 |
| 5,013,188 A | 5/1991 | Campbell et al. | 405/184 |
| 5,076,731 A | 12/1991 | Luksch | 405/154 |

(Continued)

FOREIGN PATENT DOCUMENTS

| | | | |
|---|---|---|---|
| DE | 42 25 701 C1 | 12/1993 | E21B/7/20 |
| EP | 0 094 694 A2 | 11/1983 | F16L/55/16 |
| EP | 0 444 217 A1 | 9/1991 | F16L/1/028 |
| EP | 0 872 679 A1 | 10/1998 | F16L/55/165 |
| EP | 1 088 961 A1 | 4/2001 | E21B/7/20 |
| GB | 2 214 859 A | 9/1989 | B29C/55/24 |
| JP | 62276197 | 12/1987 | E21D/9/06 |
| JP | 2030891 | 2/1990 | E21D/9/06 |
| JP | 4254087 | 9/1992 | F16L/1/024 |
| JP | 2000130082 | 5/2000 | E21D/9/06 |
| WO | WO 92/13226 | 8/1992 | F16L/55/165 |
| WO | WO 02/14007 A1 | 2/2002 | B23D/21/02 |

OTHER PUBLICATIONS

"The Next Generation of Trenchless Technology" Pipe Genie™ Brochure, (undated).

*Primary Examiner*—David Bagnell
*Assistant Examiner*—Shane Bomar
(74) *Attorney, Agent, or Firm*—McKinney & Stringer, P.C.

(57) ABSTRACT

An apparatus for bursting pipe is preferably adapted to receive rotational energy from the inner member of a dual-member drill string. In a preferred embodiment, an oscillating pipe-bursting member, driven by the interconnected inner members, cuts or bursts a subterranean pipe. In another preferred embodiment, a screw drive moves a pipe-bursting member between an expanded position and a retracted position. In another preferred embodiment, the pipe-bursting member is an arm moveable in response to operation of a screw drive. In yet another preferred embodiment, the pipe-bursting member is hydraulically actuated. This invention increases the efficiency of pipe-bursting operations by utilizing rotation energy generated by a horizontal directional boring system.

39 Claims, 10 Drawing Sheets

U.S. PATENT DOCUMENTS

| | | | |
|---|---|---|---|
| 5,098,225 A | 3/1992 | Rockower et al. | 405/156 |
| 5,171,106 A | 12/1992 | Rockower et al. | 405/156 |
| 5,173,009 A | 12/1992 | Moriarty | 405/154 |
| 5,192,165 A | 3/1993 | Torielli | 405/156 |
| 5,205,671 A * | 4/1993 | Handford | 405/184.3 |
| 5,302,053 A | 4/1994 | Moriarty | 405/154 |
| 5,306,101 A | 4/1994 | Rockower et al. | 405/154 |
| 5,328,297 A | 7/1994 | Handford | 405/184 |
| 5,403,122 A | 4/1995 | Granella | 405/184 |
| 5,439,320 A | 8/1995 | Abrams | 405/154 |
| 5,480,263 A | 1/1996 | Kayes | 405/154 |
| 5,482,404 A | 1/1996 | Tenbusch, II | 405/184 |
| 5,544,977 A | 8/1996 | Cravy et al. | 405/154 |
| 5,580,188 A | 12/1996 | Nowak | 405/184 |
| 5,628,585 A | 5/1997 | Parish, II et al. | 405/154 |
| RE35,542 E | 6/1997 | Fisk et al. | 405/156 |
| 5,775,841 A | 7/1998 | Pajunen | 405/154 |
| 5,782,311 A | 7/1998 | Wentworth | 175/53 |
| 5,785,458 A | 7/1998 | Handford | 405/184 |
| 6,092,553 A | 7/2000 | Hodgson | 138/97 |
| 6,109,832 A | 8/2000 | Lincoln | 405/184 |
| 6,305,880 B1 | 10/2001 | Carter et al. | 405/184.3 |
| 6,340,270 B2 | 1/2002 | Puttmann | 405/184.3 |
| 6,357,967 B1 | 3/2002 | Putnam | 405/184.3 |
| 6,832,877 B2 | 5/2002 | Hodgson | 405/184.3 |
| 6,524,031 B2 | 2/2003 | Carter et al. | 405/184.3 |
| 6,551,028 B2 | 4/2003 | Robinson | 405/184.3 |
| 6,659,202 B2 * | 12/2003 | Runquist et al. | 175/61 |
| 2002/0081154 A1 * | 6/2002 | Herrick et al. | 405/184 |
| 2002/0081156 A1 | 6/2002 | Coon | 405/184.1 |
| 2002/0162406 A1 * | 11/2002 | Wentworth et al. | 73/865.8 |
| 2003/0044238 A1 | 3/2003 | Wentworth et al. | 405/184.3 |

* cited by examiner

ROTARY DRIVEN PIPE-BURSTING TOOL

FIELD OF THE INVENTION

This invention relates generally to preparation for trenchless replacement of old pipe, and in particular to the bursting or cutting of subterranean pipe to allow the insertion of new pipe therein.

BACKGROUND OF THE INVENTION

Trenchless replacement of existing subterranean pipelines provides an efficient and cost effective way of replacing aged pipe and/or expanding the capacity of existing pipe. Several devices have been developed to accomplish these objectives. However, there remains an ongoing need for improved pipe replacement tools.

SUMMARY OF THE INVENTION

The present invention is directed to a pipe-bursting apparatus for use with a dual-member drill string. The drill string comprises an outer member and an inner member. The inner member is rotatable independently of the outer member. The apparatus comprises a frame connectable with the drill string and a rod rotatably supported on the frame. The rod is connectable with the inner member of the drill string. A pipe-bursting member is drivingly connected to the rod and operable in response to rotation of the rod.

The present invention further includes a horizontal directional drilling system. The horizontal directional drilling system comprises a drive machine and a dual-member drill string. The dual-member drill string has a first end and a second end. The first end of the drill string is operatively connected to the drive machine. The drill string comprises an inner member and an outer member, the inner member being moveable independently of the outer member. A pipe-bursting apparatus is operatively connected to the second end of the drill string so that movement of the inner member drives operation of the apparatus.

The present invention also includes a method for bursting pipe using a horizontal directional drilling system. The horizontal directional drilling system includes a drive machine and a dual-member drill string. The dual-member drill string has a first end and a second end. The first end is operatively connected to the drive machine. The drill string comprises an outer member and an inner member disposed longitudinally within the outer member. The inner member is rotatable independently of the outer member. A pipe-bursting apparatus is operatively connected to the second end of the drill string. The method comprising operating the pipe-bursting apparatus by rotating the inner member.

Finally, the present invention includes a method for replacing a pipe situated within a borehole using a horizontal directional drilling system. The horizontal directional drilling machine comprises a drive machine, a dual member drill string, and a pipe-bursting apparatus. The dual member drill string has a first end operatively connected to the drive machine. The drill string comprises an outer member and an inner member disposed longitudinally within the outer member. The inner member is rotatable independently of the outer member. The pipe-bursting apparatus is operatively connected to the second end of the drill string. The method comprises operating the pipe-bursting apparatus by rotating the inner member.

BRIEF DESCRIPTION OF THE DRAWINGS

FIG. 3 is a fragmented, side elevational, partly sectional view of an alternative type pipe section used with a dual-member drill string. In this type of pipe section, the pin end and box end of the inner member are reversed.

FIG. 8 is a fragmented, side elevational, partly sectional view of another embodiment of the pipe-bursting apparatus. The apparatus of FIG. 8 has a pipe-bursting member comprised of oscillating blades.

FIG. 9 is a sectional view of an alternative embodiment of the pipe-bursting apparatus. The apparatus of FIG. 9 has a pipe-bursting member comprised of a splitting member driven by the operation of hydraulic cylinders.

DETAILED DESCRIPTION OF THE PREFERRED EMBODIMENTS

Figure 1:
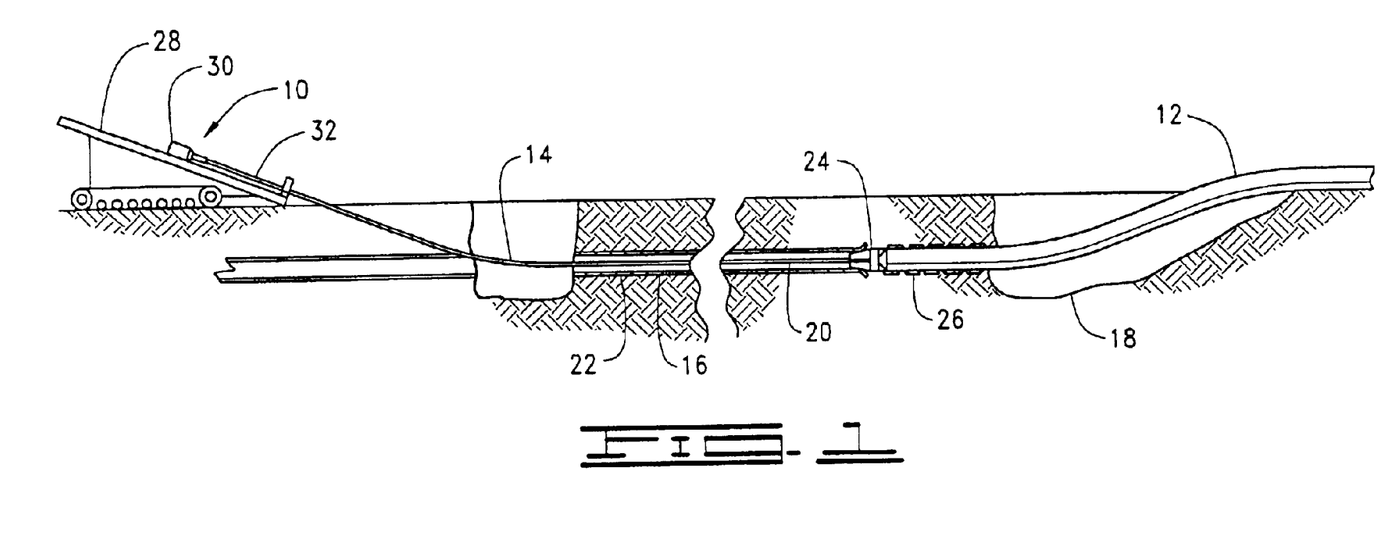
FIG. 1 is a diagrammatic representation of a near surface horizontal directional drilling machine acting on an uphole end of a drill string that, in turn, supports a pipe-bursting apparatus constructed in accordance with the present invention connected to a new pipe.

Turning now to the drawings in general, and FIG. 1 in particular, there is shown therein a horizontal directional drilling machine 10. FIG. 1 illustrates the usefulness of horizontal directional drilling by demonstrating that a replacement pipe 12 can be installed without the need for trenching along the desired path. To install the replacement pipe 12, a drill string 14 is inserted through the old pipe 16 and emerges from an exit pit 18. The downhole end 20 of the drill string 14 is then coupled to the replacement pipe 12, and the replacement pipe is towed through the existing borehole 22 as the old pipe 16 is burst. Considerable force is necessary to burst the old pipe 16 and pull the new pipe 12 through the burst pipe 26. As used herein, "burst" or "pipe-bursting" means bursting, cutting, fragmenting or any other action which ruptures the old pipe 16 to permit replacement thereof. The present invention is directed to devices and methods for improving pipe-bursting and old pipe replacement operations.

The horizontal directional drilling machine 10 generally comprises a frame 28 for supporting a drive machine 30. The drive machine 30 is movably supported on the frame 28 between a first position and a second position. Movement of the drive machine 30, by way of an axial movement means (not shown), between a first position and a second position axially retracts or advances the drill string 14 and pipe-bursting apparatus 24 through the borehole 22.

The drill string 14 is operatively connected to the drive machine 30 at an uphole end 32. A pipe-bursting apparatus 24 is coupled to the downhole end 20 of the drill string 14. In the present invention the drill string 14 transmits torque and thrust to the pipe-bursting apparatus 24 to break up the old pipe 16.

In accordance with several aspects of the present invention, it is preferable to utilize a dual-member drill string. The dual-member drill string 14 may comprise a plurality of dual-member pipe sections. Any dual-member drill string capable of transmitting torque from the drive machine 30 to the pipe-bursting apparatus may be used. For purposes of illustration, two different dual-member pipe sections, also called pipe joints, comprising the dual-member drill string will be discussed.

Figure 2:
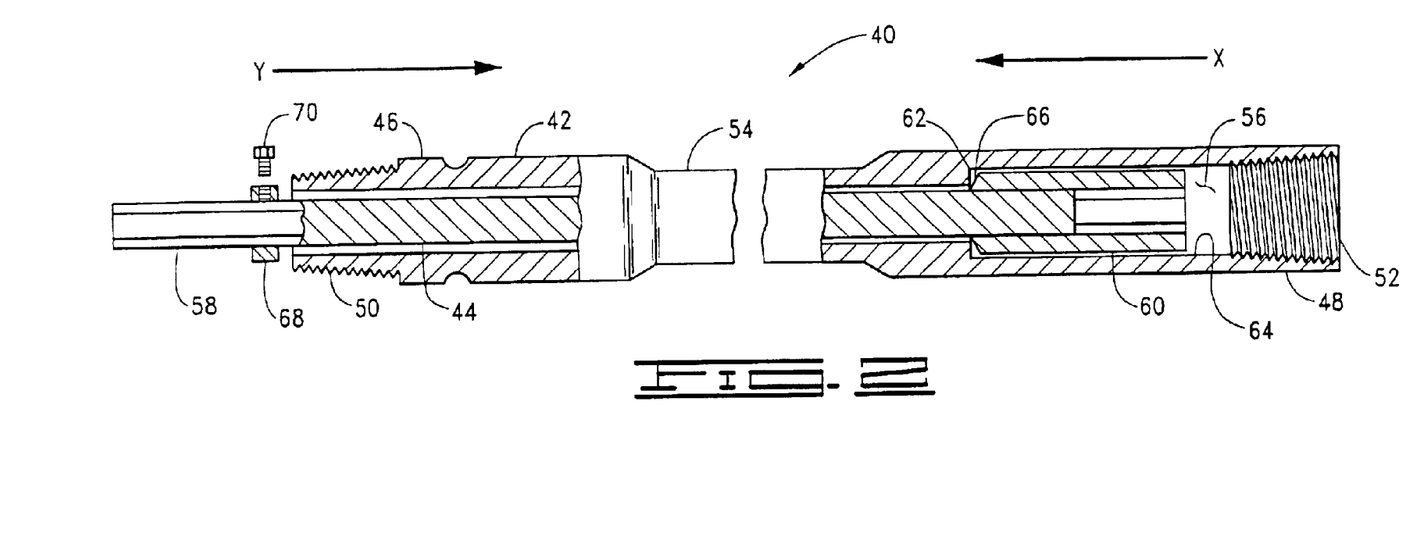
FIG. 2 shows a fragmented, side elevational, partly sectional view of a first type pipe section used with a dual-member drill string.

Turning now to FIG. 2, there is shown one of a plurality of dual-member pipe sections 40 comprising the dual-member drill string 14. The dual-member pipe section 40 comprises a hollow outer member 42 and an inner member 44 positioned longitudinally therein. The inner member 44 and outer member 42 are connectable with the inner members and outer members of adjacent dual-member pipe sections to form the dual-member drill string 14 (FIG. 1). The interconnected inner members are independently rotatable of the interconnected outer members to drive operation of the pipe-bursting tool 24.

The outer member 42 is preferably tubular having a pin end 46 and a box end 48. The pin end 46 and the box end 48 are correspondingly threaded. The pin end 46 is provided with tapered external threads 50, and the box end 48 is provided with tapered internal threads 52. Thus, the box end 48 of the outer member is connectable to the pin end 46 of a like dual-member pipe section 40. Similarly, the pin end 46 of the outer member 42 is connectable to the box end 48 of a like dual-member pipe section 40.

The external diameter of the pin end 46 and the box end 48 of the outer member 42 may be larger than the external diameter of the central body portion 54 of the outer member 42. The box end of the outer member 42 forms an enlarged internal space 56 for a purpose yet to be described.

The inner member 44 is preferably elongate. In a preferred dual-member pipe section 40, the inner member 44 is integrally formed and comprises a solid rod. However, in some instances a tubular inner member 44 may be satisfactory.

Preferably, the inner member 44 of the dual-member pipe section is provided with a geometrically-shaped pin end 58 and with a box end 60 forming a geometrically-shaped recess corresponding to the shape of the pin end 58 of the inner member 44. As used herein, "geometrically-shaped" denotes any configuration that permits the pin end 58 to be slidably received in the box end 60 and yet transmit torque between adjacent pipe sections 40. The geometrically-shaped pin end 58 and box end 60 prevent rotation of the pin end 58 relative to the box end 60 when thus connected. A preferred geometric shape for the pin end 58 and box end 60 of the inner member 44 is a hexagon. The box end 60 of the inner member 44 may be pinned, forged, welded or attached to the inner member by any suitable means.

The box end 60 of the inner member 44 is disposed within the box end 48 of the outer member 42. It will now be appreciated that the box end 48 of the outer member 42 forms an enlarged internal space 56 for housing the box end 60 of the inner member. This arrangement facilitates easy connection of the dual-member pipe section 40 with adjacent pipe sections, the drill string 14, and the drive machine 30.

It is desirable to construct the dual-member pipe section 40 so that the inner member 44 is slidably insertable in and removable from the outer member 42. This allows easy repair and, if necessary, replacement of the inner member 44. However, longitudinal movement of the inner member 44 within the outer member 42 should be restricted in the assembled dual-member pipe section 40. Accordingly, stop devices usually are provided in the dual-member pipe section 40.

The pipe section 40 may have an annular shoulder 62 formed on the inner surface 64 of the outer member 42 to limit longitudinal movement of the inner member 44 within the outer member. In addition, the box end 60 of the inner member 44 forms a shoulder 66 which is larger than the annular shoulder 62. Thus, when the inner member 44 is moved in direction X, the shoulder 66 abuts annular shoulder 62 preventing further movement in that direction.

Longitudinal movement of the inner member in the direction of the box ends 48 and 60, designated as direction Y in FIG. 2, preferably also is restricted. The pin end 58 of the inner member 44 extends a distance beyond the pin end 46 of the outer member 42. A radially projecting annular stop member 68 is disposed near the pin end 58 of the inner member 44 beyond the pin end 46 of the outer member 42. As shown in exploded view in FIG. 2, the radially projecting annular stop member preferably comprises a collar 68 and a set screw or pin 70. When the inner member 44 is moved in direction Y, the stop collar 68 abuts the pin end 46 of the outer member 42 and obstructs further movement.

Turning now to FIG. 3, there is shown an alternative dual-member pipe section 40A. The pipe section 40A comprises a hollow outer member 42A and an inner member 44A positioned longitudinally therein. The inner member 44A is preferably elongate and has a pin end 58A and a box end 60A. As previously discussed, the pin end 58A and box end 60A may be geometrically-shaped to transmit torque between adjacent pipe sections.

The geometrically-shaped pin end 58A of pipe section 40A is disposed within the box end 48A of the outer member 42A. The box end 48A of the outer member 42A forms an enlarged internal space 56A for receiving the box end 60A of a similarly formed dual-member pipe section.

The inner member 44A is positioned within the outer member 42A so as to extend to an external point beyond the pin end 46A of the outer member. The inner member box end 60A is formed by a geometrically-shaped drive collar 70 connected to the external portion of the inner member 44A. The drive collar 70 is preferably attached to the inner member using a roll pin (not shown), but may be attached to the inner member 44A by any other suitable means. The drive collar 70 has an internal geometrically-shaped bore 72 which corresponds with the geometrically-shaped pin end 58A of the inner member 44A. Use of the geometrically-shaped drive collar 70 provides a connection capable of transmitting torque between adjacent pipe sections 40A and ultimately to the pipe-bursting apparatus 24.

Figure 4:
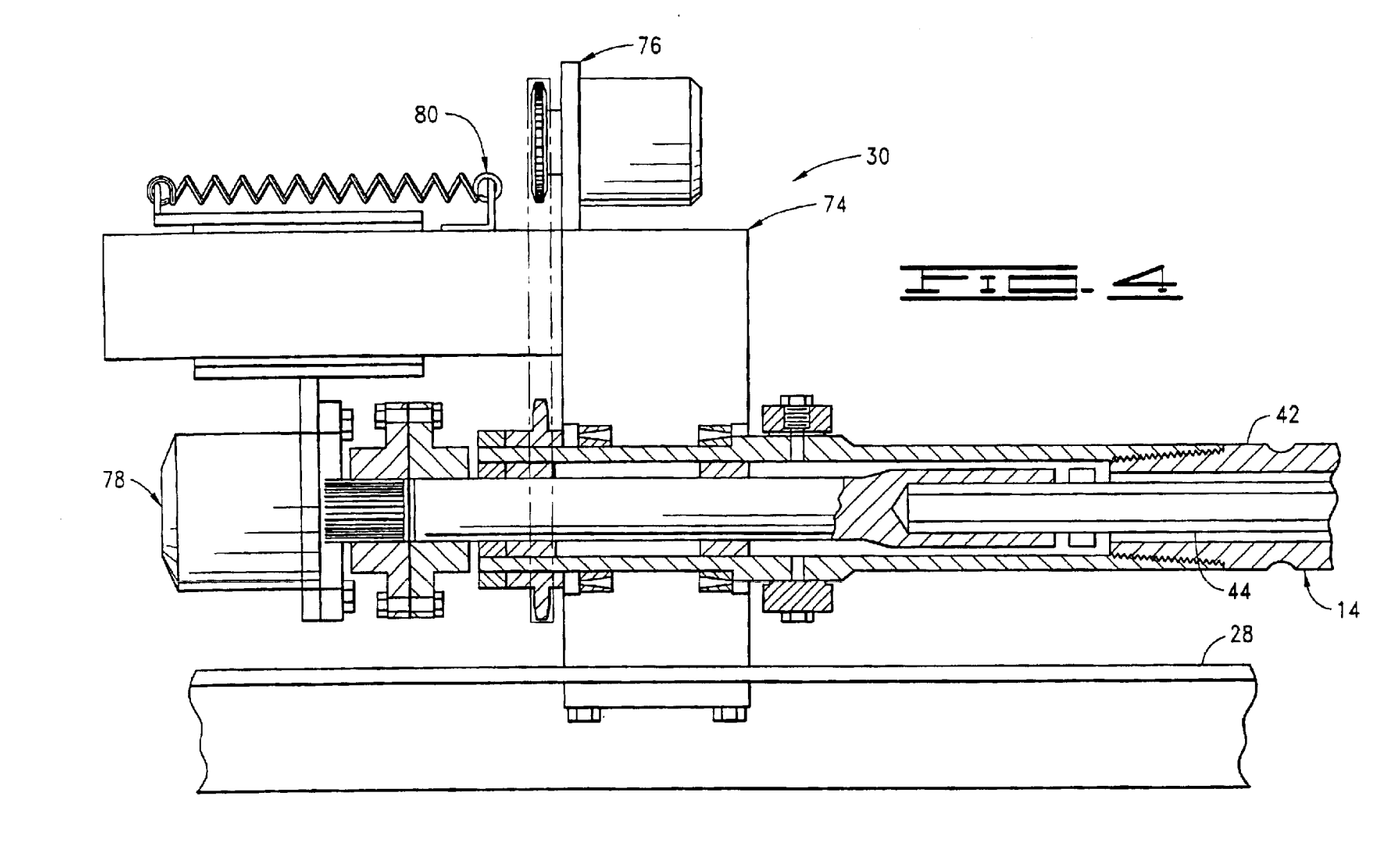
FIG. 4 is a fragmented, side elevational, partly sectional view of a preferred drive machine used with the present invention.

Turning now to FIG. 4, the drive machine 30 for driving operation of the pipe-bursting apparatus 24 is shown in more detail. Because the outer member 42 and inner member 44 rotate independently of each other, the rotary drive system 30 has two independent drive groups for driving the outer members independently of the inner members.

The drive machine 30 thus preferably comprises a carriage 74 supported on the frame 28. Supported by the carriage 74 is an outer member drive group 76 and an inner member drive group 78. The outer member drive group 76 drives the outer member 42. The inner member drive group 78 drives the inner member 44 and the pipe-bursting apparatus 24. The drive machine 30 also comprises a biasing assembly 80 for urging engagement of the pipe sections. A suitable drive machine 30 having an outer member drive group 76 for driving the outer member 42, and an inner member drive group 78 for driving the inner member 44 is disclosed in more detail in U.S. Pat. No. 5,682,956, the contents of which are incorporated herein by reference.

Figure 5:
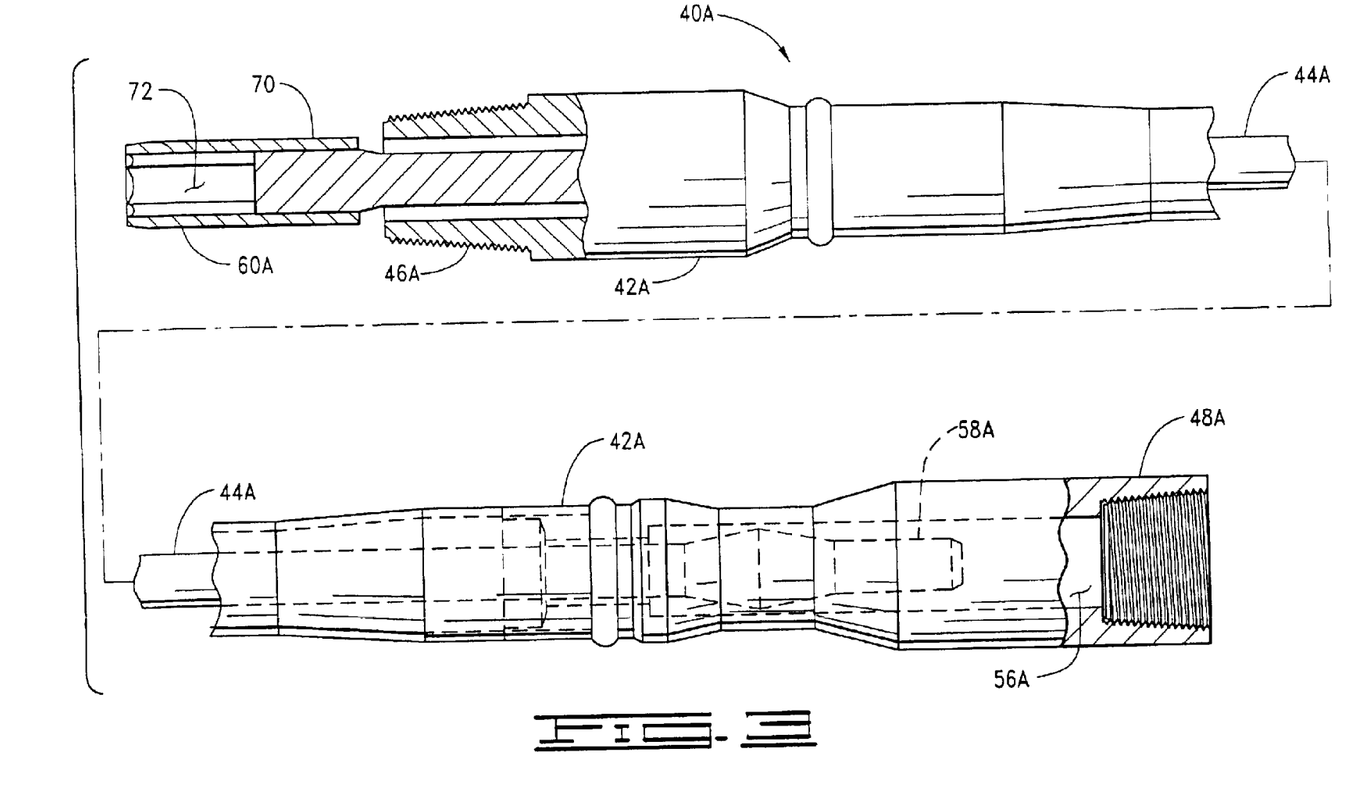
FIG. 5 is a side elevational, partly sectional view of a first embodiment of the pipe-bursting apparatus wherein the pipe-bursting member is a pivoting linkage.
Figure 6:
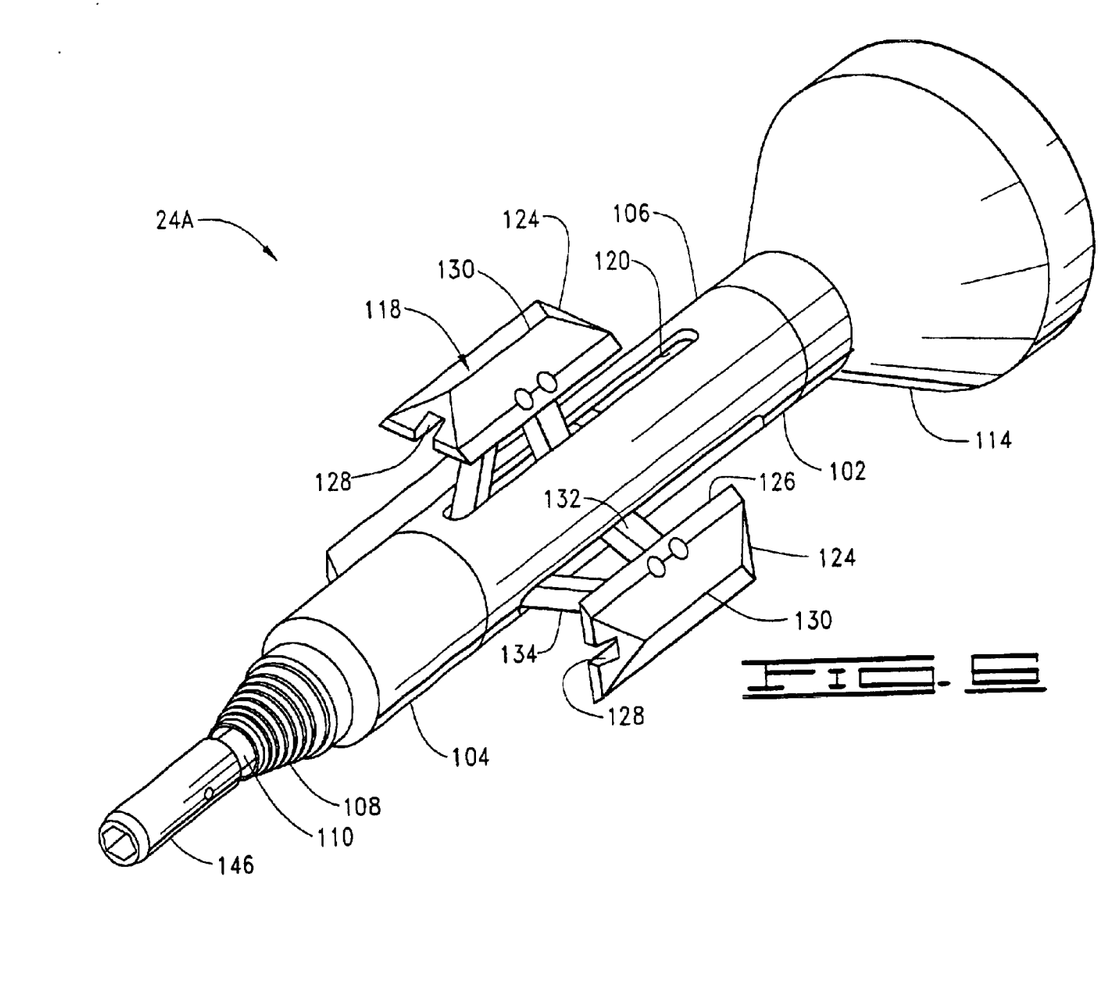
FIG. 6 is a perspective view of the pipe-bursting apparatus of FIG. 5.

Turning now to FIGS. 5 and 6, there is illustrated therein a first embodiment of the pipe-bursting apparatus 24A for use with the previously described horizontal directional drilling system. The pipe-bursting apparatus 24A includes a frame 102 having an uphole end 104 and a downhole end 106. The uphole end 104 has external threads 108 for connecting to the outer member 42A of the dual-member drill string 14. As seen in FIG. 6, the frame 102 of the present embodiment may generally be characterized as a housing within which is supported a rod 110. Additionally, the frame 102 is preferably constructed to have openings 120 formed on the body of the frame.

As illustrated in FIG. 5, the downhole end 106 of the frame 102 may have internal threads 112 for connecting to an expansion bell 114. The expansion bell 114 is constructed to force fragments of the old pipe 16 (FIG. 1) into the surrounding soil and allows for the replacement pipe to be drawn into the borehole. The expansion bell 114 may be constructed to include a connection member 116 to allow towing of the replacement pipe 12 (FIG. 1) into the borehole.

External threads 108, on the uphole end 104 of the housing 102, provide a connection that is capable of transmitting torque from the outer member 42A of the drill string 14 to the pipe-bursting apparatus 24A for positioning and rotationally orienting the apparatus within the borehole 12.

The rod 110 is rotatably supported on the frame 102 and connectable with the inner member 44A of the drill string 14. In the present embodiment, the rod 110 threadedly engages a movable collar 122 supported within the frame 102. The rod 110 and movable collar 122 function as a screw drive for operation in response to rotation of the inner member 44A. Movement of the collar 122 in response to rotation of the rod causes the pipe-bursting member 118 to move between an expanded and retracted position.

As shown in FIGS. 5 and 6, the pipe-bursting member 118 may comprise a pipe-engaging wedge 124 driven by the moveable collar 122. The pipe-engaging wedge 124 is preferably elongate having a generally flat underside 126, a lengthwise groove 128, and a tapered edge 130. The groove 128 is formed on the underside 126 of the wedge 124, extends the entire length of the wedge and is used for a purpose yet to be described. The tapered edge 130 engages the old pipe and causes bursting of the old pipe. The tapered edge 130 may be formed from any resilient material able to withstand repetitive localized pressure against the old pipe (FIG. 1).

The pipe-engaging wedge 124 is operatively connected to the movable collar 122 and the frame 102 by arms 132 and 134. Arm 132 is preferably connected to the movable collar 122 at one end and the pipe-engaging wedge 124 at the other end. The wedge 124 is moveably connected to the frame 102 by arm 134. The movable arms 132 and 134 link rotation of the rod 110 to movement of the pipe-engaging wedge 124.

With reference to FIG. 5, self-locking pins 136 may be used to pivotally connect the arms 132 and 134 to each of the pipe-engaging wedge 124, movable collar 122 and frame 102. Pins 136 permit replacement of the wedge 124, when worn, or the substitution of wedges having different configurations, when necessary. Use of pins 136 to mount the wedge 124 to the arms 132 and 134 permits pivotal movement of the wedge between the retracted and expanded position. It will be appreciated that attaching the wedge 124 to arms 132 and 134 is not limited to the use of self-locking pins 136. Alternatively, threaded bolts or screws could be used in place of the pins 136.

The movable collar 122 may be generally cylindrical having an internally threaded bore 138 engaging the correspondingly threaded segment 140 of the rod 110. Threaded engagement between the rod 110 and the collar 122 causes the collar to travel in response to rotation of the rod. The extension of arms 132 and 134 through opening 120 prohibits rotation of the movable collar within the frame 102. The movable collar 122 may have an external groove 142 for receiving arm 132 when the pipe-bursting member 118 is in the retracted position.

Continuing with FIG. 5, the rod 110 is rotatably mounted within the housing 102. Bearings 144 and 145 support the rod 110 within the housing 102 for co-axial rotation therein. Preferably, a geometrically-shaped drive collar 146 is connected to the portion of the rod 110 extending beyond the uphole end 104 of the housing 102. The drive collar 146 provides for easy connection with a correspondingly-shaped inner member. The use of a geometrically-shaped drive collar 146 to connect the inner member of the dual-member drill string to the pipe-bursting apparatus 24A is preferred; however, connection may be accomplished in any way that allows for torque transmission from the inner member of the drill string to the rod 110.

When the inner member of the dual-member drill string 14 is rotated in a first direction, the threaded segment 140 of the rod 110, forming part of the screw drive, communicates with the corresponding internally threaded bore 138 of the movable collar 122. This threaded interaction causes the movable collar 122 to travel in direction X as the rod 110 rotates. Moving the collar 122 in direction X causes arms 132 and 134 and wedge 124 to move to the expanded position. This causes the tapered edge 130 of the wedge 124 to engage and rupture the old pipe 16 (FIG. 1) from within.

The pipe-bursting wedge 124 is moved to the retracted position by rotating the inner member of the drill string 14 the opposite or second direction. This reverses the effect of the screw drive by moving the collar 122 in direction Y. Moving the collar 122 in direction Y moves the bursting wedge 124 to a retracted position. As the collar 122 is moved in direction Y, the arm 132 retracts into both the wedge groove 128 and collar groove 142.

Now, it will be understood that the pipe-bursting apparatus of FIGS. 5 and 6 is preferably used in a step-wise fashion along the length of the old pipe. The pipe-bursting apparatus is axially advanced in the retracted position to the desired point within the old pipe. If orientation of the bursting device within the bore is deemed to be critical, the outer member of the drill string may be rotated to properly orient the pipe-bursting apparatus. Once the pipe-bursting apparatus is properly positioned within the old pipe, the inner member is rotated to expand the pipe-bursting member and burst the old pipe. After the pipe-bursting member has been radially expanded to burst the old pipe, the inner member is rotated in the opposite, or second direction to move the pipe-bursting apparatus into the retracted position. The apparatus is axially advanced to the next segment of unbroken old pipe and the process is repeated. The process is continued until the desired length of old pipe has been burst and the replacement pipe inserted in its stead.

As shown in FIG. 6, it will be appreciated that the housing 102 of pipe-bursting apparatus 24A may be constructed to have multiple openings 120 so that multiple pipe-bursting members 118 may be used.

Figure 7:
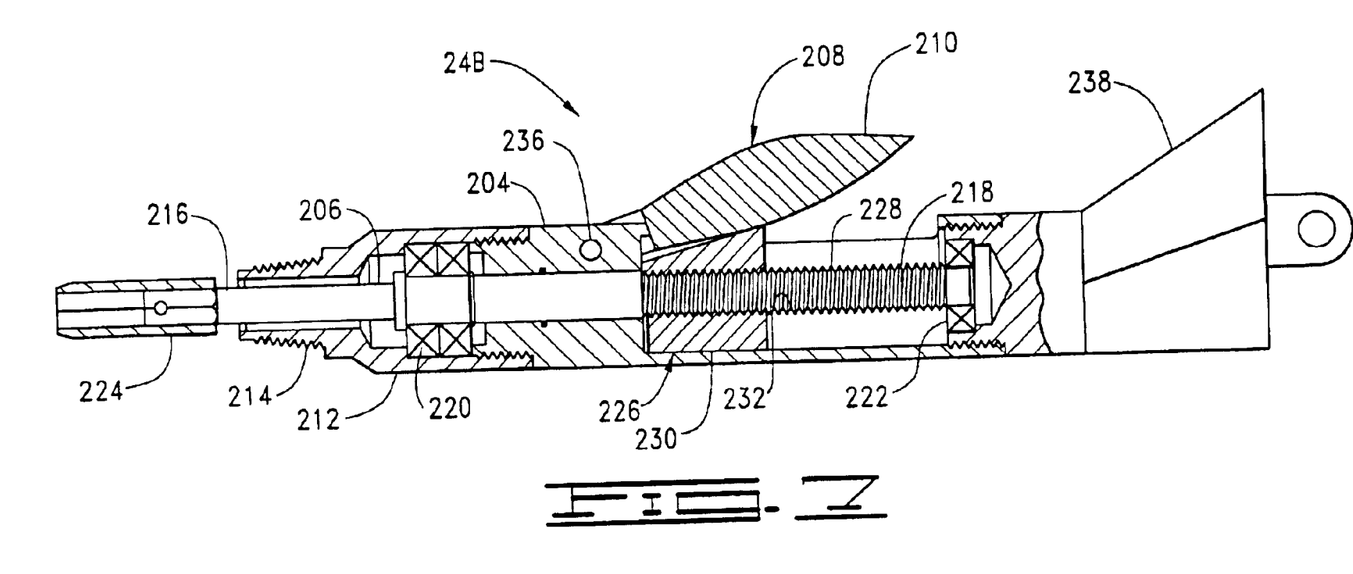
FIG. 7 is a side elevational, partly sectional view of another embodiment of the pipe-bursting apparatus of the invention. The apparatus of FIG. 7 takes the form of a pipe-bursting member having a pivotally mounted pipe-bursting wedge. In this embodiment, a single pipe-bursting wedge is operated by a moveable collar.

Turning now to FIG. 7, there is shown a second embodiment of a pipe-bursting apparatus 24B. The pipe-bursting apparatus 24B is connectable to a dual-member drill string and comprises a frame 204, a rod 206 rotatably supported on the frame, and a pipe-bursting member 208 drivingly connected to the rod. The pipe-bursting member 208 is operable in response to rotation of the rod 206. The embodiment of FIG. 7 illustrates a pipe-bursting member 208 comprising at least one pipe-engaging wedge 210 pivotally connected to the frame 204 and moveable between an expanded position and a retracted position in response to rotation of the rod.

The frame 204 comprises an uphole end 212 having external threads 214 for connecting the apparatus 24B to the box end of a correspondingly threaded outer member of a dual-member drill string (FIG. 3).

The rod 206, having a first end 216 and a second end 218, is supported by bearings 220 and 222 for co-axial rotation within the frame 204. The first end 216 of the rod 206 may comprise a geometrically-shaped box end 224 for connection with the correspondingly shaped pin end of the inner member of a dual-member drill string 40A (FIG. 3).

The second end 218 of the rod 206 comprises a screw drive system 226 to drive operation of the pipe-bursting member 208. The screw drive system 226 comprises a screw 228 and a movable collar 230. The movable collar 230 has an internal bore 232 to threadedly receive the screw 228. The movable collar 230 is non-rotatably supported by the frame 204 and movable between a first position and a second position in response to rotation of the screw 228. Axial movement of the collar 230 to the position shown in FIG. 7 causes the collar to laterally expand the pipe-engaging wedge 210.

The pipe-engaging wedge 210 is pivotally connected to the frame 204 by self-locking pin 236. Use of pin 236 permits replacement of the wedge 210 when worn and allows pivotal movement of the wedge in response to rotation of the rod 206.

After the apparatus 24B has been properly oriented by rotating the outer members of the dual-member drill string, the inner member of the drill string is rotated to radially extend the pipe-engaging wedge 210. Extension of the pipe-engaging wedge 210 will cause the wedge to contact the inner wall of the old pipe. As the wedge 210 is forced outward, it will cause the wall of the old pipe to fracture at the point of contact. After local fracture of the old pipe, the rod 206 is counter-rotated to cause the wedge 210 to retract. The pipe-bursting apparatus 24B is then drawn forward within the old pipe to the next position. As the pipe-bursting apparatus is drawn forward, an expansion bell 238 will cause the fractured pipe to further fracture and force the old pipe fragments into the surrounding soil. After advancement of the pipe bursting apparatus 24B, the expansion process is repeated to cause another local fracture of the old pipe. This cycle is repeated along the length of the pipe to be replaced.

Turning now to FIG. 8, there is shown another embodiment of the pipe-bursting apparatus. In this embodiment, the pipe-bursting apparatus 24C has a pipe-bursting member 300 comprised of oscillating blades 302. The embodiment of FIG. 8 illustrates the use of a pair of blades connected to opposing sides of the housing, however, it will be appreciated that the number of blades may be altered without departing from the spirit of the present invention.

The pipe-bursting apparatus 24C may be constructed so that it is connectable to any dual-member drill string 14 (FIG. 1). However, for purposes of illustration, pipe-bursting apparatus 24C is shown connected to pipe section 40, previously discussed with reference to FIG. 2. The pipe-bursting apparatus 24C comprises a frame 304 and a rod 306 rotatably supported within the frame. The frame 304 comprises an uphole end 308 and a downhole end 310. The uphole end 308 comprises external threads 312 for connecting to the box end 48 (FIG. 2) of a correspondingly threaded pipe section 40. The downhole end 310 of the frame 304 is adapted for connection to a swivel connector assembly 314. A pipe puller (not shown) may be attached to the connector assembly 314 for towing the new pipe into the borehole as the pipe-bursting apparatus 24C is axially advanced.

Referring still to FIG. 8, the first end 316 of rod 306 may comprise a geometrically-shaped pin end 318. The pin end 318 allows for connection with the correspondingly shaped box end 60 of the inner member 44 of the dual-member pipe section 40. Bearings 320 and 321 support the second end 322 of the rod 306 for rotation within the frame 304.

The pipe-bursting member uses pivotally mounted blades 302 to burst the old pipe. The blades 302 are mounted to the frame 304 using self-locking pins 334. The use of self-locking pins 334 allows for easy replacement or substitution of the blades. The blades 302 are generally elongate and have a pipe-engaging surface 336. A generally rounded projection 340 is formed on the underside 338 of the blade 302. The rounded projection 340 is adapted to be engaged by rotating cam members, described hereinafter. The blade 302 may be constructed from a resilient material such as case hardened steel which is capable of withstanding repeated impact of the pipe-engaging surface 336 with the old pipe.

The pipe-bursting member 300 further comprises a cam system 326 supported on the rod 306. The cam system 326 comprises a plurality of cylindrical cam members 328 having an eccentrically positioned through-hole 332. The cylindrical cam member is supported on the rod 306 for fixed rotation therewith using a key member 333. However, the through-hole 332 may be geometrically-shaped to transfer torque from the rod 306 to cam member 328. The cam members 328 may further comprise ball or roller bearing 330 adapted to roll past the rounded projection 340 as the cam member 328 is rotated with the rod 306.

The cam members 328 may be oriented to cause oscillation of the blades 302 in any one of several patterns. The inner member drive group 78 of the rotary drive system 30 rotates the rod 306. Rotating the rod 306 causes rotation of the cam members 328 within the frame 304. In operation, either the cam members 328 or the bearings 330 may contact their corresponding blades during only a portion of one revolution because of the eccentric position of the through-holes 332.

The shape of the frame 304 is preferably conical, increasing in diameter from the uphole end 308 to the downhole end 310. The preferred conical shape of the frame 304 allows for the uphole end 308 to pass through the existing inner diameter of the pipe being replaced with little resistance. The diameter of the downhole end 310 may be just slightly larger than the outer diameter of the replacement pipe. This shape allows the frame 304 to force the fractured pipe into the surrounding soil.

As the pipe-bursting apparatus 24C is pulled back by the horizontal directional drilling machine 10 (FIG. 1), the replacement pipe is pulled into the newly expanded borehole. The outer member of the drill string may be rotated by the drive machine 30 (FIG. 1) to orient the pipe-bursting apparatus 24C. The inner member transmits torque to the rod 306 by way of the geometrically-shaped connection between the rod 306 and the box end 60 of the inner member. The cam members 328 are rotated with the rod 306. In the embodiment of FIG. 8, rotation of the eccentrically-shaped cam members 328 causes the bearings 330 to engage the rounded projections 340. This engagement forces the blades to pivot and expand radially from the housing and thus burst the old pipe as the new pipe is pulled into position.

Turning now to FIG. 9, there is shown therein another embodiment of a pipe-bursting apparatus 24D constructed for the splitting and replacement of underground pipes. Pipe-bursting apparatus 24D is adapted to burst old pipes composed of ductile materials such as steel or iron. The pipe-bursting apparatus 24D of FIG. 9 utilizes a hydraulic pump 402 to generate hydraulic pressure sufficient to pull the pipe-bursting member 404 through the pipe to be replaced. The pipe-bursting apparatus 24D comprises a frame 406, a rod 408 rotatably supported on the frame 406, and the pipe-bursting member 404. Pipe-bursting apparatus 24D uses a gripper assembly 410 to provide the reaction force necessary to withstand the pull generated by the hydraulic cylinder assembly 412 in driving operation of a pipe-splitting bell 416.

As illustrated in FIG. 9, the frame 406 may generally be characterized as a housing within which is supported the hydraulic pump 402 and the rod 408. The frame 406 has external threads 418 for connecting to the outer member 42A (FIG. 3) of the dual-member drill string 14. The external threads 418 provide a connection that is capable of transmitting torque from the outer member 42A of the drill string 14 to the pipe-bursting apparatus 24D for positioning and rotationally orienting the apparatus within the old pipe.

The rod 408 is rotatably supported on the frame 406 by bearings 407 and connectable with the inner member 44A (FIG. 3) of the drill string 14. In the present embodiment, the rod 408 operatively engages the hydraulic pump 402 supported within the frame 406. Preferably, a geometrically-shaped drive collar 420 is connected to the portion of the rod 408 extending beyond the external threads 418 of the housing 406. As previously discussed, the drive collar 420 provides for easy connection with a correspondingly-shaped inner member 42A (FIG. 3).

The pipe-bursting apparatus 24D is adapted so that the hydraulic pump 402 may supply pressurized fluid to the gripper assembly 410 and hydraulic cylinder assembly 412 substantially simultaneously. Rotation of the rod 408 drives operation of the hydraulic pump 402 to pressurize the hydraulic fluid. The hydraulic pump 402 draws hydraulic fluid from a reservoir 422 having a collapsible bladder 424, via hose 426. The pressurized fluid is then supplied to the gripper assembly 410 and to the cylinder assembly 412 through hose 430.

A control valve 428 controls the flow of hydraulic fluid to and from the reservoir 422 through the suction hose 426 and a return hose 427. The fluid is pulled from the reservoir 422, then passes through a hose 430 to the gripper assembly 410. The hose 430 is connected to the gripper assembly housing 432 using a threaded connection 434. The fluid is pumped into a chamber 436 within the gripper assembly housing 432.

The fluid pumped into the gripper assembly housing 432 applies pressure to the pistons 438 and 440 to extend the pistons from the housing. The pistons 438 and 440 each have a gripping means comprised of a plurality of carbide buttons 442 which engage the inner wall of the pipe being replaced. The carbide buttons 442 provide frictional force necessary to hold the pipe-bursting apparatus 24D in place while the hydraulic cylinder assembly 412 is actuated. It will be appreciated that other methods, such as machining or knurling the top surfaces of pistons 438 and 440, may be used to facilitate the necessary gripping action.

While a gripping assembly composed of pistons 438 and 440 is disclosed herein, it is anticipated that other types of gripping devices may be used with the invention to accomplish the same purpose. For example, mechanical wedges could be extended from the gripper assembly 410 either through the action of hydraulic cylinders or screw-type actuators (not shown).

Hydraulic pressure within the gripper assembly 410 builds in response to the resistance encountered by the pipe-splitting bell 416 as the apparatus 24D is pulled through the old pipe 16 (FIG. 1). In response to increased hydraulic pressure, the pistons 438 and 440 are radially extended from the gripper assembly housing 432 to engage the inner surface of the old pipe 16 (FIG. 1) with increasing force. A shoulder bolt 444 and compression spring 446 regulate movement of the pistons 438 and 440 within the housing 432. The compression spring 446 pulls the pistons 438 and 440 into the housing when the hydraulic pressure is decreased.

The fluid chamber 436 is connected to the cylinder assembly 412 so that the hydraulic fluid may flow into the cylinder assembly 412 and the gripper assembly 410 substantially simultaneously The hydraulic cylinder assembly 412 comprising hydraulic cylinders 448 and 450, pulls the pipe-splitting bell 416 through the old pipe as the gripper assembly 410 holds the pipe-bursting apparatus in a fixed position within the old pipe. To pull the pipe-splitting bell 416 in direction X, both hydraulic cylinders 448 and 450 act upon a common cylinder rod 452.

The hydraulic cylinders 448 and 450 comprise downhole cavities 454 and 456, and uphole cavities 458 and 460. Fluid is supplied to the downhole cavities by conduits 462 and 464. The conduits 462 and 464 are formed in the cylinder rod 452 and communicate with an internal bore 468 formed in the cylinder rod. The uphole cavities 458 and 460 do not fill with hydraulic fluid, but have vents (not shown) to vent air from within the cavities to the outside environment.

The cylinder rod 452 is connected to the pipe-splitting bell 416 using a threaded connection (not shown). It will, however, be appreciated that the pipe-splitting bell 416 may be connected to the cylinder rod 452 in any manner sufficient to withstand the pulling force exerted on the pipe-splitting bell. The pipe-splitting bell 416 comprises one or more pipe-cutting blades 470 and is generally conical in shape. The conical shape of pipe-splitting bell 416 forces fragments of the old pipe into the surrounding soil and expands the existing borehole so that the replacement pipe may be drawn into the borehole with little resistance. The blades 470 may be constructed of any material resilient enough to withstand the forces exerted upon them.

Referring to FIGS. 1 and 9, the apparatus 24D is connected to the dual-member drill string at the exit pit 18 using threads 418 and the geometrically-shaped connector 420. After connection to the drill string, the pipe-bursting apparatus 24D is drawn into the old pipe 16 until the pipe-splitting bell 416 engages the old pipe 16. When tension on the pipe-splitting bell 416 begins to increase, the inner member 44A (FIG. 3) of the drill string is rotated to activate the hydraulic pump 402. In response to rotation of the inner member 44A, the control valve 428 opens and the pump 402 draws hydraulic fluid from the reservoir 422 and to the gripper assembly 410 and hydraulic cylinder assembly 412.

In response to the increased hydraulic pressure within the gripper assembly 410, the pistons 438 and 440 extend radially from the gripper assembly housing 432 to hold the pipe-bursting apparatus 24D in place during operation of the hydraulic cylinder assembly 412. As the pressure within the gripper assembly 410 increases, the hydraulic pressure within the hydraulic cylinder assembly 412 also increases to pull the pipe-splitting bell 416 through the old pipe 16 and cause the old pipe to split.

When the hydraulic cylinder assembly 412 has reached the end of its stroke, rotation of the inner member 44A (FIG. 3) may be stopped thereby reducing the hydraulic pressure supplied to the gripper assembly 410 and the hydraulic cylinder assembly 412. Reduction in the pressure supplied to the gripper assembly 410 causes the compression springs 446 to retract the pistons 438 and 440. The horizontal directional drilling machine 10 then pulls the apparatus 24D further into the old pipe until the hydraulic cylinder assembly 412 is extended back to its original position and the pipe-splitting bell 416 encounters resistance sufficient to warrant reactivating the hydraulic pump 402. When the hydraulic cylinders 448 and 450 are retracted, the oil in cavities 454 and 456 flows back through hose 430, into control valve 428 where it is shunted back to the reservoir 422 through return hose 427. This cycle is repeated until the desired length of old pipe has been burst.

The pipe-bursting apparatus 24D of FIG. 9 has been described herein using two hydraulic cylinders 448 and 450. It will, however, be appreciated that the apparatus may be modified to use one hydraulic cylinder instead of the two cylinders described herein. It will likewise be appreciated that pipe-bursting apparatus 24D may employ three or more cylinders to perform the same function as the two hydraulic cylinders 448 and 450.

Figure 10:
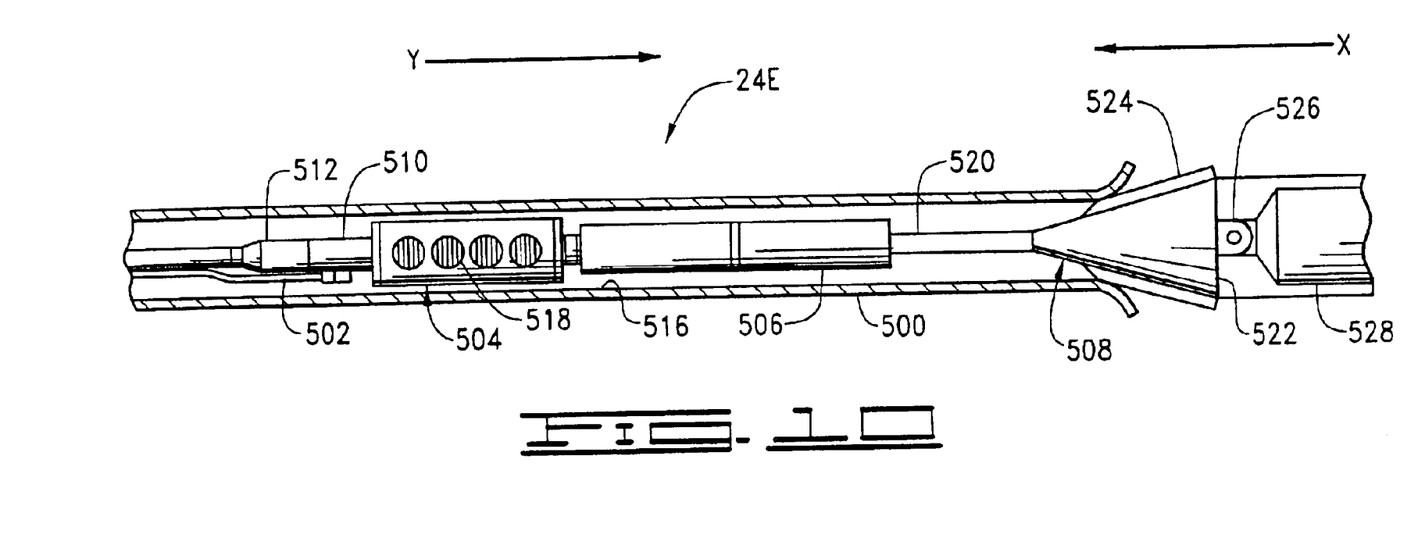
FIG. 10 shows a modification of the pipe-bursting apparatus of FIG. 9. The hydraulic pressure necessary to drive the hydraulic cylinders is generated above-ground and pumped downhole to the pipe-bursting apparatus along a single-member drill string.
Figure 11:
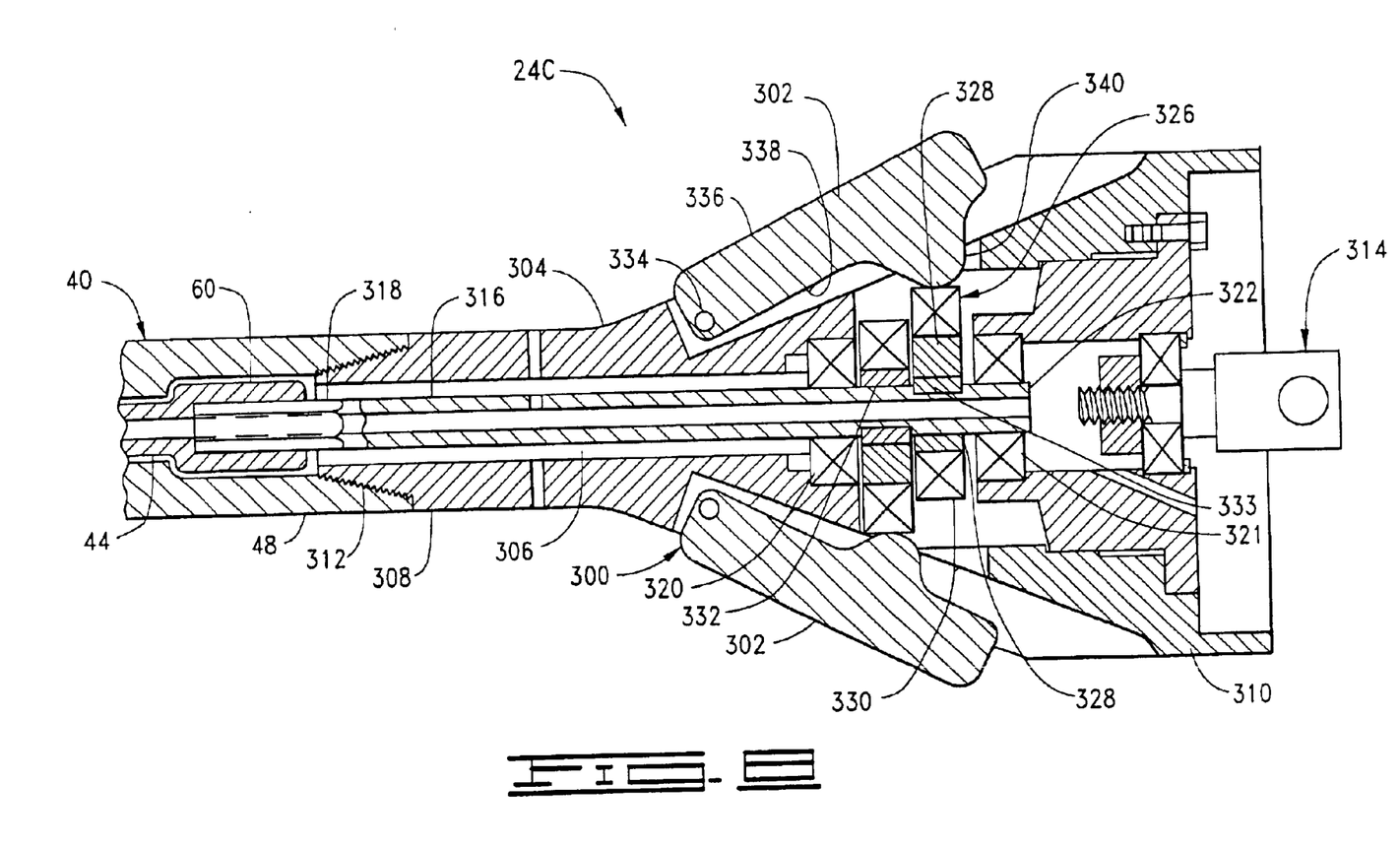

Turning now to FIG. 10, there is illustrated therein an alternative embodiment of the pipe-bursting apparatus 24D. The pipe-bursting apparatus 24E of FIG. 10 uses hydraulic pressure to burst the pipe to be replaced 500. Hydraulic fluid is pressurized at a point uphole from the pipe-bursting apparatus 24E and pumped to the pipe-bursting apparatus using a hydraulic pump (not shown) and a hydraulic line 502. The pipe-bursting apparatus of FIG. 10 has a gripper assembly 504, a hydraulic cylinder assembly 506, and a pipe-bursting member 508. The pipe-bursting member is driven by cooperative operation of the gripper assembly 504 and the hydraulic cylinder assembly 506.

In the present embodiment, fluid is pumped through the borehole 22 (FIG. 1) via the hydraulic hose 502 to a connector segment 510. The connector segment 510 is generally elongate and has external threads (not shown) on one end for connecting the connector segment 510 to the internally threaded end (not shown) of a single-member drill string 512. The connector segment 510 may have an internal conduit (not shown) through which the pressurized fluid flows from the hydraulic hose 502 to the gripper assembly 504. Thus, the other end of the connector segment 510 forms a sealed connection with the gripper assembly 504.

Alternatively, the pressurized fluid for operating the device may be supplied through the drill pipe 14 (FIG. 1). If a dual-member drill string having a solid inner pipe is used, the hydraulic fluid could flow through the annulus between the inner pipe and the hollow outer pipe. If the inner pipe of the dual-member drill string is hollow, the fluid could be supplied to the pipe-bursting apparatus through the inner member. If the boring operation employs the use of a single pipe drill string, the hydraulic fluid may be supplied to the pipe-bursting apparatus 24D through an internal passage (not shown).

The gripper assembly 504 uses the pressurized fluid to apply pressure to the inner surface 516 of the old pipe 500 to hold the pipe-bursting apparatus 24E in place while the hydraulic cylinder assembly 506 is operated. Hydraulic pressure within the gripper assembly 504 increases in response to resistance encountered by pulling the pipe-bursting member 508 through the old pipe 500 in direction X. The gripper assembly 504 may comprise a plurality of pistons 518 which provide the gripper assembly with sufficient frictional force to grip the inner surface 516 of the old pipe 500 and hold the pipe-bursting apparatus 24E in a fixed position during operation of the pipe-bursting member 508.

While the gripper assembly 504 holds the pipe-bursting apparatus 24E in a fixed position, the hydraulic cylinder assembly 506 operates on a cylinder rod 520 to pull the pipe-bursting member 508 in direction X and through the old pipe 500. The cylinder rod 520 may be constructed from any material that is resilient enough to withstand repetitive intense axial forces exerted upon the cylinder rod by the hydraulic cylinder assembly 506.

The cylinder rod 520 is connected to the pipe-bursting member 508 using a threaded connection (not shown). The pipe-bursting member 508 comprises a pipe-splitting bell 522. The pipe-splitting bell 522 has a generally conical shape, one or more pipe-cutting blades 524 spaced about the circumference of the member, and a connection member 526 to allow towing of the replacement pipe 528. The pipe-splitting bell 522 has a conical shape to force fragments of the old pipe 500 into the surrounding soil. Additionally, the pipe-splitting bell 522 may be sized so that it will act to enlarge the existing borehole and facilitate insertion of a new pipe 528 having a larger diameter than the old pipe 500.

Pipe-bursting apparatus 24E operates like pipe-bursting apparatus 24D, the operation of which does not bear repeating here. However, the hydraulic pump used with the present embodiment may reside above-ground and does not require energy from the rotating inner member of the dual-member drill string.

It will now be appreciated that any one of the previously discussed pipe-bursting apparatuses may have several sensors to provide the operator with operational information. For example, the pipe-bursting apparatus may have a plurality of sensors (not shown) supported by the housing near the pipe-bursting member. The sensors may be adapted to provide the operator with feedback regarding positioning of pipe-bursting member, whether the pipe-bursting member is in the extended or retracted position, and the amount of force being exerted upon the old pipe by the pipe-bursting apparatus. Additionally, the pipe-bursting operation may be further assisted by a beacon (not shown) positioned near any one of the previously described pipe-bursting apparatuses. The beacon may be adapted to provide the operator with information about the position and orientation of the pipe-bursting apparatus.

The present invention also comprises a method for bursting pipe using a horizontal directional drilling system 10. The method employs a horizontal directional drilling machine and a dual-member drill string. A pipe-bursting apparatus is operatively connected to the second end of the dual-member drill string. Preferably one of the pipe-bursting apparatus, 24A, 24B, 24C or 24D as described herein, may be used in carrying out this method.

Having determined the need for replacing the old pipe 16 without digging a trench, the dual-member drill string 14 is inserted through the section of pipe to be replaced 16. The pipe-bursting apparatus 24 is connected to the downhole end of the drill string 14 as it protrudes from the far end of the old pipe. After connecting the pipe-bursting apparatus 24 to the drill string 14, the apparatus is positioned within the old pipe by advancing, withdrawing or rotating the outer member. Once the pipe-bursting apparatus has been positioned, the inner member is rotated to operate the pipe-bursting apparatus. While the inner member is rotated, the horizontal directional drilling machine may pull the drill string, pipe-bursting apparatus, and replacement pipe through the old pipe.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A pipe-bursting apparatus for use with a drive machine and a dual-member drill string comprising an outer member and an inner member, wherein both the outer member and the inner member are connected to the drive machine, and wherein the inner member is rotatable independently of the outer member, the apparatus comprising:
    a frame connectable with the drill string;
    a rod rotatably supported on the frame and connectable with the inner member of the drill string; and
    a pipe-bursting member drivingly connected to the rod and operable in response to rotation of the rod.

2. The apparatus of claim 1 wherein the pipe-bursting member comprises at least one blade operatively connected to the frame for movement in response to rotation of the rod.

3. The apparatus of claim 1 wherein the frame comprises a housing, and wherein the pipe-bursting member comprises at least one pair of blades connected to opposing sides of the housing and adapted for oscillation in response to rotation of the rod.

4. The apparatus of claim 1 wherein the frame comprises a housing having at least one opening, and wherein the pipe-bursting member is retractable and expandable through the opening in response to rotation of the rod.

5. The apparatus of claim 4 wherein the pipe-bursting member comprises at least one oscillating blade moveable through the opening.

6. The apparatus of claim 1 wherein the pipe-bursting member is movable between an expanded position and a retracted position in response to rotation of the rod.

7. The apparatus of claim 6 wherein the pipe-bursting member comprises at least one arm, the arm being operatively connected to the rod for movement between the expanded position and the retracted position in response to rotation of the rod.

8. The apparatus of claim 7 comprising a screw drive for moving the arm between the expanded position and the retracted position.

9. The apparatus of claim 6 wherein the pipe-bursting apparatus further comprises a movable collar operatively engaging the rod for movement in response to rotation of the rod, and wherein the pipe-bursting member is attached to the frame for movement between the expanded position and the retracted position in response to movement of the collar.

10. The apparatus of claim 9 wherein the rod comprises a threaded portion, wherein the movable collar threadedly engages the threaded portion of the rod so that the collar travels along the rod in response to rotation of the rod, and wherein the pipe-bursting member moves between the expanded position and the retracted position in response to travel of the collar along the threaded portion of the rod.

11. The apparatus of claim 10 wherein the pipe-bursting member comprises a pivoting linkage driven by the movable collar.

12. The apparatus of claim 1 wherein the pipe-bursting member comprises a pipe-splitting bell and a hydraulic cylinder assembly operatively connected to the pipe-splitting bell, and wherein the hydraulic cylinder assembly retracts the pipe-splitting bell in response to hydraulic pressure generated by the hydraulic pump.

13. The apparatus of claim 12 wherein the pipe-bursting apparatus further comprises a hydraulic pump assembly driven by rotation of the rod, a gripper assembly operable in response to hydraulic pressure generated by the pump assembly, wherein the gripper assembly secures the pipe-bursting apparatus during operation of the pipe-bursting member.

14. A horizontal directional drilling system comprising:
    a drive machine;
    a dual-member drill string, having a first end and a second end;
    wherein the drill string comprises an inner member and an outer member, wherein the inner member is moveable independently of the outer member;
    wherein the first end of both the inner and outer members of the drill string are connected to the drive machine; and
    a pipe-bursting apparatus operatively connected to the second end of the drill string so that movement of the inner member drives operation of the apparatus.

15. The horizontal directional drilling system of claim 14 wherein the inner member is solid.

16. The horizontal directional drilling system of claim 14 wherein the dual-member drill string comprises a plurality of pipe sections, each pipe section comprising a hollow outer member and an inner member, wherein the outer member has a pin end and box end correspondingly threaded for connection with the pin and box ends of adjacent pipe sections, wherein the inner member has a geometrically-shaped pin end and box end for connection with the pin and box ends of adjacent pipe sections, wherein the pipe-bursting apparatus comprises a frame with an end correspondingly threaded for connection with the adjacent end of the outer member of the adjacent pipe section of the drill string, and a rod supported on the frame, the rod comprising a geometrically shaped end slidably engageable with the adjacent end of the inner member of the adjacent pipe section of the drill string.

17. The horizontal directional drilling system of claim 14 wherein movement of the inner member comprises rotating the inner member.

18. The horizontal directional drilling system of claim 14 wherein the pipe-bursting apparatus comprises a frame having at least one opening, a rod rotatably supported on the frame, and a pipe-bursting member supported on the frame and movable between a retracted position and an expanded position through the opening in response to rotation of the inner member.

19. The horizontal directional drilling system of claim 18 wherein the pipe-bursting member comprises at least one blade operatively connected to the frame for movement in response to rotation of the inner member.

20. The horizontal directional drilling system of claim 14 wherein the pipe-bursting apparatus comprises:
   a fame;
   a rod rotatably supported on the frame for rotation with the inner member of the drill string; and
   a pipe-bursting member drivingly connected to the rod to be operable in response to rotation of the rod.

21. The horizontal directional drilling system of claim 20 wherein the frame comprises a housing, and wherein the pipe-bursting member comprises at least one pair of blades connected to opposing sides of the housing and adapted for oscillation in response to rotation of the rod.

22. The horizontal directional drilling system of claim 20 wherein the frame comprises a housing having at least one opening, and wherein the pipe-bursting member is movable between an expanded position and a retracted position in response to rotation of the rod.

23. The horizontal directional drilling system of claim 22 wherein the pipe-bursting member comprises at least one blade movable through the opening in response to rotation of the rod.

24. The horizontal directional drilling system of claim 20 wherein the pipe-bursting member is movable between an expanded position and a retracted position in response to rotation of the rod.

25. The horizontal directional drilling system of claim 20 wherein the pipe-bursting member comprises a pipe-splitting bell, and a hydraulic cylinder assembly operatively connected to the pipe-splitting bell, wherein the hydraulic cylinder assembly retracts the pipe-splitting bell in response hydraulic pressure generated by the hydraulic pump.

26. The horizontal directional drilling system of claim 25 wherein the pipe-bursting apparatus further comprises a hydraulic pump assembly driven by rotation of the rod, a gripper assembly operable in response to hydraulic pressure generated by the pump assembly, and wherein the gripper assembly secures the pipe-bursting apparatus during operation of the pipe bursting member.

27. The horizontal directional drilling system of claim 20 wherein the pipe-bursting apparatus further comprises a movable collar operatively engaging the rod for movement in response to rotation of the rod, and wherein the pipe-bursting member is attached to the frame for movement between the expanded position and the retracted position in response to movement of the collar.

28. The horizontal directional drilling system of claim 27 wherein the rod comprises a threaded portion, wherein the movable collar threadedly engages the threaded portion of the rod so that the collar travels as the rod rotates, and wherein the pipe-bursting member moves between the expanded position and the retracted position in response to travel of the collar along the threaded portion of the rod.

29. The horizontal directional drilling system of claim 27 wherein the pipe-bursting member comprises a pivoting linkage driven by the movable collar.

30. The horizontal directional drilling system of claim 27 wherein the pipe-bursting member further comprises at least one pipe-engaging wedge, and wherein the pipe-engaging wedge is driven in response to rotation of the rod.

31. The horizontal directional drilling system of claim 14 comprising an expansion bell operatively connected to the pipe-bursting apparatus, adapted to force pipe fragments into the subterranean formation.

32. A method for bursting pipe using a horizontal directional drilling system including a drive machine; a dual-member drill string having a first end and a second end; wherein the drill string comprises an outer member and an inner member disposed longitudinally within the outer member; wherein both the outer member and the inner member are connected to the drive machine; and wherein the inner member is rotatable independently of the outer member; a pipe-bursting apparatus operatively connected to the second end of the drill string, the method comprising:
   operating the pipe-bursting apparatus by rotating the inner member.

33. The method of claim 32 further comprising:
   before operating the pipe-bursting apparatus, positioning the pipe-bursting apparatus by advancing, withdrawing, or rotating the outer member.

34. The method of claim 32 wherein the pipe-bursting apparatus comprises a pipe-bursting member movable between an expanded position and a retracted position, and wherein the operating step comprises moving the pipe-bursting apparatus between the expanded position and the retracted position by rotating the inner member.

35. A method for replacing a pipe situated within a borehole using a horizontal directional drilling system comprising a drive machine; a dual-member drill string having a first end and a second end; wherein the drill string comprises an outer member and an inner member disposed longitudinally within the outer member; wherein both the outer member and the inner member are connected to the drive machine; and wherein the inner member is rotatable independently of the outer member; a pipe-bursting apparatus operatively connected to the second end of the drill string, the method comprising:
   operating the pipe-bursting apparatus by rotating the inner member.

36. The method of claim 35 wherein the horizontal directional drilling system further comprises an expansion member and a replacement pipe connection member attached thereto, and wherein the method further comprises:
   expanding the borehole by pulling the expansion device through the borehole; and
   towing a replacement pipe connected to the replacement pipe connection member.

37. A pipe-bursting apparatus for use with a drive machine and a dual-member drill string comprising an outer member and an inner member, wherein both the outer member and the inner member are connected to the drive machine, and wherein the inner member is rotatable independently of the outer member, the apparatus comprising:
   a frame connectable with the outer member of the dual-member drill string;
   a rod rotatably supported on the frame and connectable with the inner member of the drill string; and
   a pipe-bursting member drivingly connected to the rod and operable in response to rotation of the rod.

38. The apparatus of claim 37 wherein the frame comprises a housing having at least one opening, and wherein the pipe-bursting member is retractable and expandable through the opening in response to rotation of the rod.

39. The apparatus of claim 37 wherein the pipe-bursting member is movable between an expanded position and a retracted position in response to rotation of the rod.

* * * * *